US006483277B1

United States Patent
Harmon

(10) Patent No.: US 6,483,277 B1
(45) Date of Patent: Nov. 19, 2002

(54) COMMON PIN VOLTAGE REGULATOR

(75) Inventor: Jack Douglas Harmon, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/841,616

(22) Filed: Apr. 24, 2001

(51) Int. Cl.[7] ................................................ H02J 7/14
(52) U.S. Cl. .......................................... 322/28; 322/99
(58) Field of Search .............................. 322/25, 26, 27, 322/28, 99

(56) References Cited

U.S. PATENT DOCUMENTS

| 4,316,134 A | | 2/1982 | Balan et al. ................. 322/99 |
|---|---|---|---|
| 4,379,990 A | * | 4/1983 | Sievers et al. ............... 320/123 |
| 4,386,310 A | * | 5/1983 | Sievers ........................ 320/123 |
| 4,415,849 A | * | 11/1983 | Sievers et al. ................ 322/33 |
| 4,733,159 A | * | 3/1988 | Edwards et al. .............. 322/28 |
| 5,581,172 A | * | 12/1996 | Iwatani et al. ................ 322/24 |
| 5,675,237 A | * | 10/1997 | Iwatani ........................ 322/28 |
| 6,313,613 B1 | * | 11/2001 | Iwatani et al. ................ 322/12 |

* cited by examiner

Primary Examiner—Nicholas Ponomarenko
(74) Attorney, Agent, or Firm—Margaret A. Dobrowitsky

(57) ABSTRACT

A voltage regulator having a single I/F terminal is disclosed. According to the teachings of the present invention, the I/F terminal of the present invention precludes the use of an I terminal alternator model and a separate F terminal model. The I/F terminal provides the function of both the I and F terminal which were heretofore provided in separate voltage regulator models.

7 Claims, 4 Drawing Sheets

COMMON PIN VOLTAGE REGULATOR

BACKGROUND OF THE INVENTION

This invention relates generally to an automotive alternator system, and more specifically to a voltage regulator for r such a system that advantageously reduces the number of external connections between the voltage regulator and the various automotive systems.

Voltage regulator controlled automotive recharging systems are commonly used to keep an automotive storage battery at full charge and to provide sufficient electrical power for the operation of the various automotive electrical accessories. Conventionally, an alternator provides a rectified output current as it is driven by a belt and pulley arrangement coupled to the automobile internal combustion engine. The alternator comprises a field winding, a 3-phase stator winding, and a full-wave diode rectifier for converting the poly-phase AC output of the windings to a DC voltage. The alternator operation is controlled through a closed feedback system by the voltage regulator, which senses the battery voltage and controls the alternator field coil excitation in response thereto attempts to maintain a full charge on the battery. An indicator lamp typically provides an indication to the automobile operator of the absence of an alternator output voltage and in this way alerts the operator to a malfunction in the electrical system.

In some charging systems, a continuous DC field coil excitation current is provided. Alternatively, switching-based voltage regulators operate in an on/off mode wherein a switching device is utilized to alternately stepwise excite the alternator field coil between full and zero excitation values. In this system, the rate of the stepwise excitation and the duration of the excitation periods are varied in accordance with engine speed and the resistive load placed upon the battery. Generally, the alternator is defined as that device producing a polyphase output current. When an alternator is coupled with a voltage regulator, the device is referred to as a generator, which supplies a DC current for charging the automobile battery.

In today's automobile market, the alternator and the attendant voltage regulator are usually supplied by an automotive parts vendor to the automobile manufacturers. There are many different automobile types and also many different electrical/charging systems among those automobile types. Although there is some commonality between electrical/charging systems employed in each automobile, many also have unique requirements in the interface between the automobile engine control systems and the alternator and voltage regulator. As a result, alternator/voltage regulator vendors are required to supply several unique products to interface with the wide variety of automobile control systems. Designing, manufacturing and assuring that sufficient inventory exists for each of the many alternator/regulator models results in unnecessary expense for the alternator vendor, which is generally passed through to the automobile manufacturer and then to the automobile purchaser.

BRIEF SUMMARY OF THE INVENTION

The present invention overcomes the disadvantages associated with the supply of several different generator (or alternator/voltage regulator combination) models. In particular, by interconnecting certain voltage regulator terminals according to the teachings of the present invention, a single generator model can be employed in several different automobile systems. In the prior art, several different generator systems are required, dependent on the interface requirements of the electrical charging system of the automobile.

BRIEF DESCRIPTION OF THE DRAWINGS

The present invention can be more easily understood and the further advantages and uses thereof more readily apparent, when considered in view of the description of the preferred embodiments below and the following figures in which.

DETAILED DESCRIPTION OF THE PREFERRED EMBODIMENTS

Figure 1:
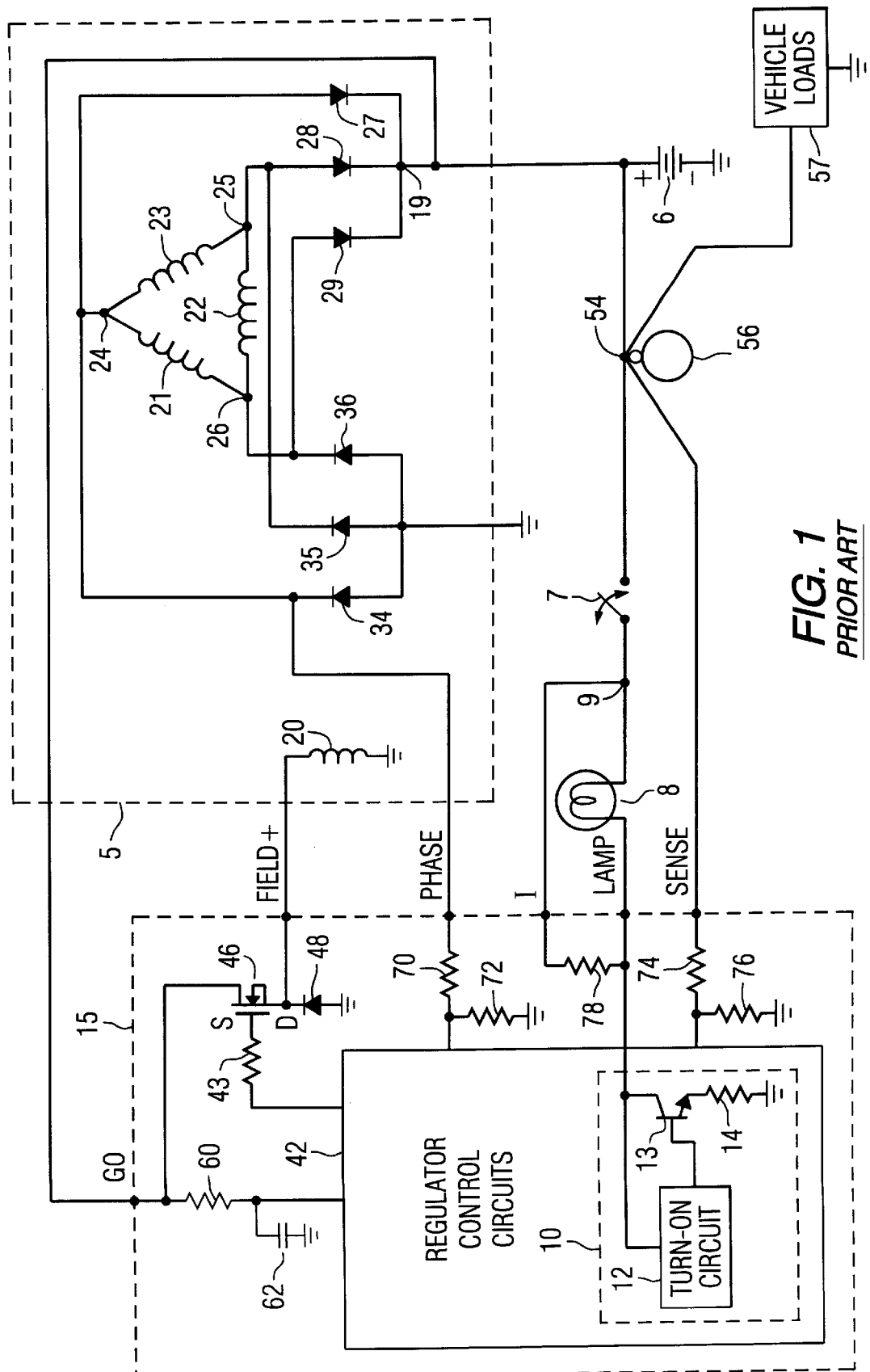
FIGS. 1 and 2 are combination block diagrams and electrical schematic diagrams of prior art alternator, voltage regulator and battery systems.

Before describing in detail the particular apparatus in accordance with the present invention, it should be observed that the present invention resides primarily in a novel combination of hardware related to a voltage regulator for an automobile alternator. Accordingly, the hardware components have been represented by conventional elements in the drawings, showing only those specific details that are pertinent to the present invention so as not to obscure the disclosure with structural details that will be readily apparent to those skilled in the art having the benefit of the description herein.

FIG. 1 illustrates a portion of a prior art automotive electrical system to which the teachings of the present invention can be applied. The battery charging system of FIG. 1 comprises an alternator 5, a battery 6, an ignition switch 7, a charge indicating lamp 8 and a voltage regulator 15.

The alternator 5 comprises a rotatable field coil winding 20 that is drivingly coupled to the crank shaft of the automobile engine. The alternator 5 further comprises three stationary alternator output windings 21, 22 and 23, which are connected in a delta configuration between three terminals 24, 25 and 26 as shown. It is understood by those skilled in the art that the windings 21, 22 and 23 can also be configured in a wye winding configuration. Each of the terminals 24, 25 and 26 is coupled to a respective anode terminal of a rectifying diode 27, 28 and 29. The cathode terminals of the diodes 27, 28 and 29 are connected to a positive rectified output terminal 19. Each of the terminals 24, 25 and 26 is also connected to the cathode terminal of diodes 34, 35 and 36, the anode terminals of which are connected to ground.

All of the components 20 through 36 are typically considered part of the alternator 5 and reside either within the alternator within the alternator housing. In operation, the alternator 5 receives field coil excitation from a field+ terminal of the voltage regulator 15. In response to the excitation applied to the field coil 20 and its rotation by the automobile engine, the alternator windings 21, 22 and 23, operating in conjunction with the various diodes 27, 28, 29, 34, 35, and 36, provide a rectified battery charging output signal between the positive rectified output terminal 19 and ground. This output signal is utilized to charge the battery 6 and maintain a predetermined charge level corresponding to a preset battery voltage magnitude. The structure and operation of the alternator 5 is well known to those skilled in the art and therefore will not be discussed further herein.

The ignition switch 7 is serially connected between a terminal 9 of the charge indicating lamp 8 and the positive terminal of the battery 6. A second terminal of the charge indicating lamp 8 is connected to a lamp terminal of the voltage regulator 15. When the ignition switch 7 is closed, current flows from the battery 6 through the charge indicating lamp 8 to a lamp driver circuit 10 within the regulator control circuits 42. The voltage on the lamp terminal turns on the regulator 15. Also, when the switch 7 is closed, a starter motor 56 is energized by the battery 6 for starting the automobile engine. In lieu of the physical switch 7 shown in FIG. 1, a pull-up switch in the vehicle computer controller can be used. The switch 7 remains closed during operation of the vehicle; the pull-up switch may be switched off at certain times to reduce the load on the engine.

The lamp driver 10 comprises a turn-on circuit 12, for driving a transistor 13 via the base terminal thereof. The lamp terminal is further connected to ground via the collector-emitter junction of the transistor 13 and a series resistor 14. Immediately after the switch 7 is closed, the turn-on circuit 12 senses rotation of the alternator 5 (via circuitry within the regulator control circuits 42, not shown in FIG. 1) and in response turns the transistor 13 off, thus opening the circuit between the lamp 8 and ground, thereby extinguishing the lamp 8. The driver circuit 10 is further responsive to rotation of the alternator for turning the lamp 8 on when there is no rotation. The lamp is illuminated when the turn-on circuit 12 turns the transistor 13 on, so that the lamp 8 is connected between the battery 8 and ground via the collector-emitter junction of the transistor 13 and the series resistor 14. The turn-on circuit 12 is also responsive to certain voltage faults (not germane to the present invention) for illuminating the lamp 8.

Further, in response to the closure of the switch 7 to start the vehicle, the regulator control circuits 42 bias the gate terminal of an MOSFET 46 via a resistor 43. The drain terminal of the MOSFET 46 provides the field excitation current to the field coil winding 20 via a field+terminal (also referred to as the F+terminal). Conventionally, the field excitation current is a pulse-width modulated signal. A suppression diode 48 is connected between the drain terminal of the MOSFET 46 and ground as shown. Also, when the ignition switch 7 is closed, a power supply circuit within the regulator 15 is activated for supplying DC power for the various components of the regulator control circuits 42. As is well known by those skilled in the art, the ignition switch 7 corresponds to the automobile ignition switch. The function and operation of the switch 7 and the charge indicating lamp 8 are well known to those of average skill in the art.

The P or phase input terminal of the voltage regulator 15 is connected to the cathode terminal of the diode 34. This connection provides a phase angle signal to the voltage regulator control circuits 42 to determine the rotational speed of the alternator 5. A voltage divider comprising resistors 50 and 72 is interposed between the phase input terminal and the regulator control circuits 15 to properly adjust the magnitude of the phase angle signal. In the event either of the diodes 34 or 27 fails (either opens or shorts) the phase signal is lost and in response the voltage regulator 15 illuminates the charge indicating lamp 8 via the turn-on circuit 12. In the event the switch 7 is opened, to shut off the engine for example, but the engine continues to run, as determined by the continued presence of a signal on the phase input terminal, the alternator 5 continues to charge the battery 6, but at a lower voltage level.

In certain automobile installations, a voltage sensing terminal, referred to as an S terminal or sense terminal, of the voltage regulator 15 is coupled to a terminal 54 of the starter motor 56. As discussed above, when the switch 7 is closed, the starter motor 56 is energized by the battery 6 for starting the automobile engine. The voltage sensing terminal 52 provides a signal representative of the battery voltage to the regulator control circuits 42, via a voltage divider comprising the resistors 74 and 76. In response to this sensed battery voltage, the voltage regulator 15 provides field coil excitation to the field coil 20, resulting in the alternator 5 providing a rectified alternator output charging signal between the terminal 19 and ground. In this way, the battery charging system forms a closed loop feedback system wherein the alternator 5 maintains the voltage across the battery 6 at a preset magnitude, thereby maintaining the battery 6 in a charged condition.

In other automobile installations an internal voltage sense is utilized in lieu of the external sense provided at the sense terminal of the voltage regulator 15. The internal sense is provided by the terminal GO, which is discussed further hereinbelow, of the regulator 15. The external sense technique is typically used where the battery 6 is located a significant distance from the alternator 5, due to the series resistance and the voltage drop created thereby in the wire connecting the alternator 5 and the battery 6.

The terminal 54 is also connected to the battery 6 and vehicle loads, illustrated in the aggregate as vehicle loads 57, for supplying energy to those loads during operation of the vehicle.

The GO terminal of the regulator 15 is connected to the terminal 17 of the alternator 5. A DC voltage is provided to the terminal GO from the battery 6, for supplying operating voltage to the regulator control circuits 42. A filter comprising a resistor 60 and a capacitor 62 is interposed between the GO terminal and the voltage regulator circuits 42. A first terminal of the resistor 60 is connected to the GO terminal and the second terminal thereof is connected to the regulator control circuits 42. The second terminal of the resistor 60 is also connected to ground via a capacitor 62. Thus, the resistor 60 and the capacitor 62 function as a voltage divider and filter for the DC voltage present at the terminal GO.

In the embodiment of the voltage regulator 15 illustrated in FIG. 1, an I terminal of the voltage regulator 15 is connected to the terminal 9 between the charge indicating lamp 8 and the switch 7. Internal to the voltage regulator 15, the I terminal is connected to the lamp terminal via a resistor 78 as shown. The I terminal serves as a redundant terminal for conveying switch 7 closure status to the regulator control circuits 42 when the lamp has burned out, i.e., opened.

Figure 2:
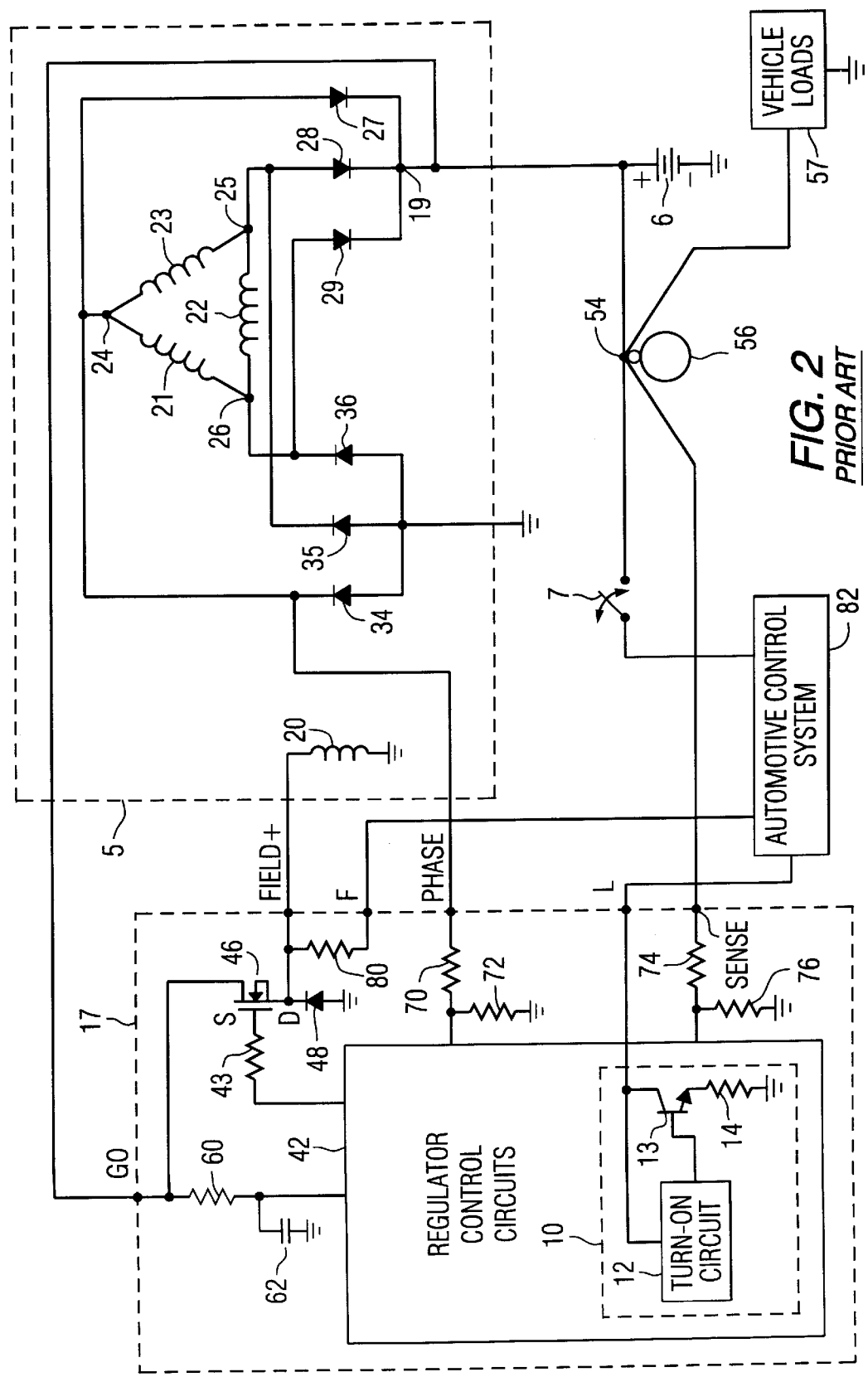

FIG. 2 illustrates an embodiment of a voltage regulator 17 similar to the voltage regulator 15 of FIG. 1; excluding the I terminal from FIG. 1, but including an F terminal connected to the field+terminal via a resistor 80, as shown, and further connected to an automotive control system 82. The automotive control system 82 senses the voltage at the F terminal to determine whether and how much field excitation current is being supplied to the rotating field coil 20. This voltage determines whether an idle boost is appropriate when the loads 57 are requiring additional current. That is, the F terminal signal is representative of the field excitation current and if that current is at its maximum value, then the automotive control system 82 increases the engine idle speed so that more current is supplied by the alternator 5 to the vehicle loads 57. In the so-called F-terminal model, i.e., the voltage regulator 17, as shown in FIG. 2, the switch 7 is connected to the automotive control system 82 to sense switch closure. Closure of the switch 7 provides power to the automotive control system 82 and activates the voltage regulator 17. The lamp 8 is not present in the FIG. 2 embodiment, and thus the lamp terminal is referred to as the L terminal. The control system 82 monitors the F-terminal and L-terminal voltages for illuminating a trouble signal on the vehicle dashboard (not shown in FIG. 2).

In summary, the prior art includes two different voltage regulator models; the voltage regulator 15 illustrated in FIG. 1 and a the voltage regulator 17 illustrated in FIG. 2. The FIG. 1 embodiment includes an I terminal while the FIG. 2 embodiment includes an F terminal. The automobile manufacturer chooses either the I terminal model or the F terminal model dependent upon the specific engine control systems designed into the automobile.

Figure 3:
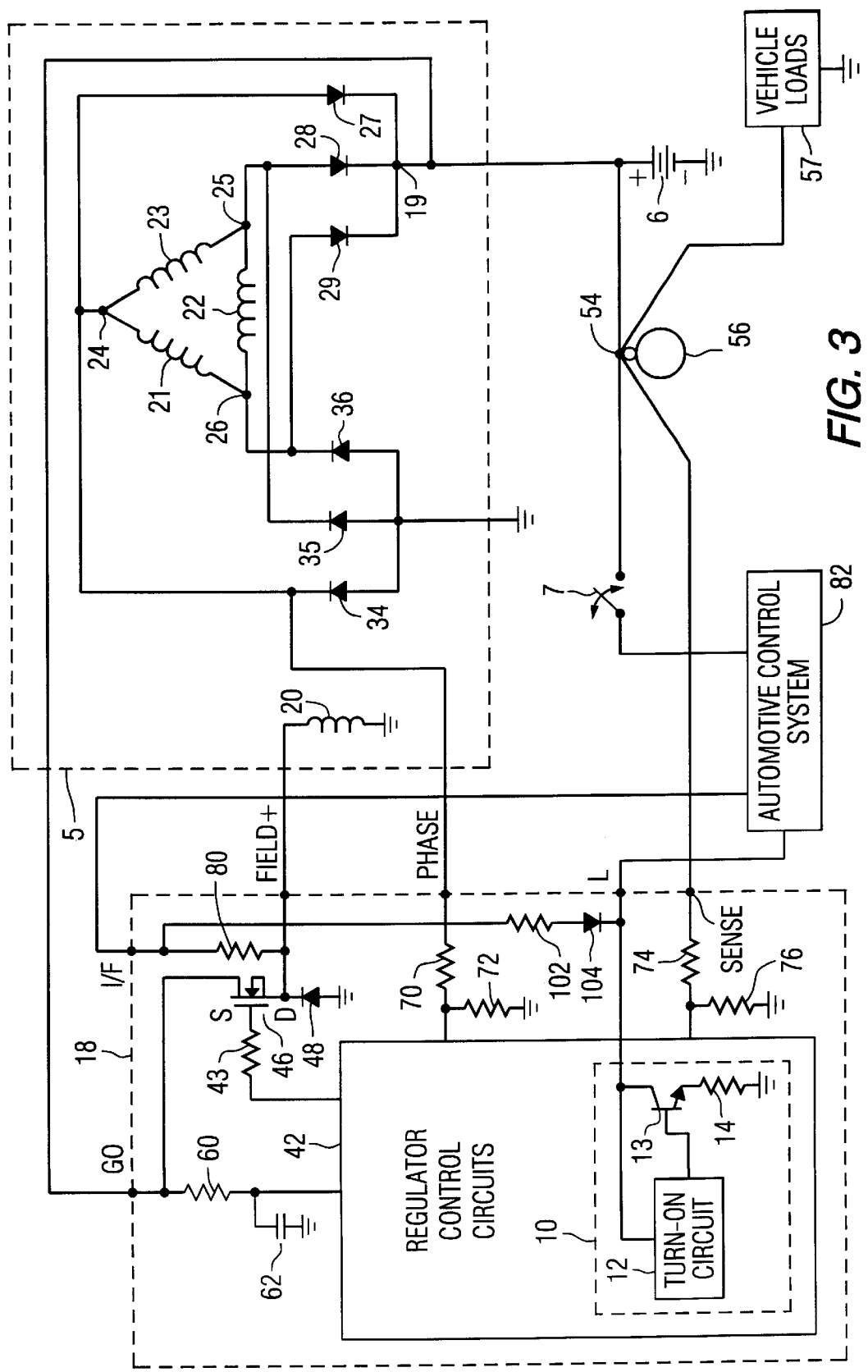
FIGS. 3 and 4 are combination block diagrams and electrical schematic diagrams illustrating an alternator, voltage regulator and battery system according to the teachings of the present invention.

Advantageously, according to the teachings of the present invention a voltage regulator 18 is provided wherein a single terminal, referred to as the I/F terminal, replaces both the I terminal model of FIG. 1 and the F terminal model of FIG. 2. As shown in FIG. 3, the voltage regulator 18 (I/F terminal model) includes the resistor 80 connected to the field+ terminal as shown in FIG. 2, and further including a connection between the I/F terminal and the lamp terminal via the series combination of a resistor 102 and a diode 104. The anode terminal of the diode 104 is connected to the resistor 102 and the cathode terminal thereof is connected to the lamp terminal.

Figure 4:
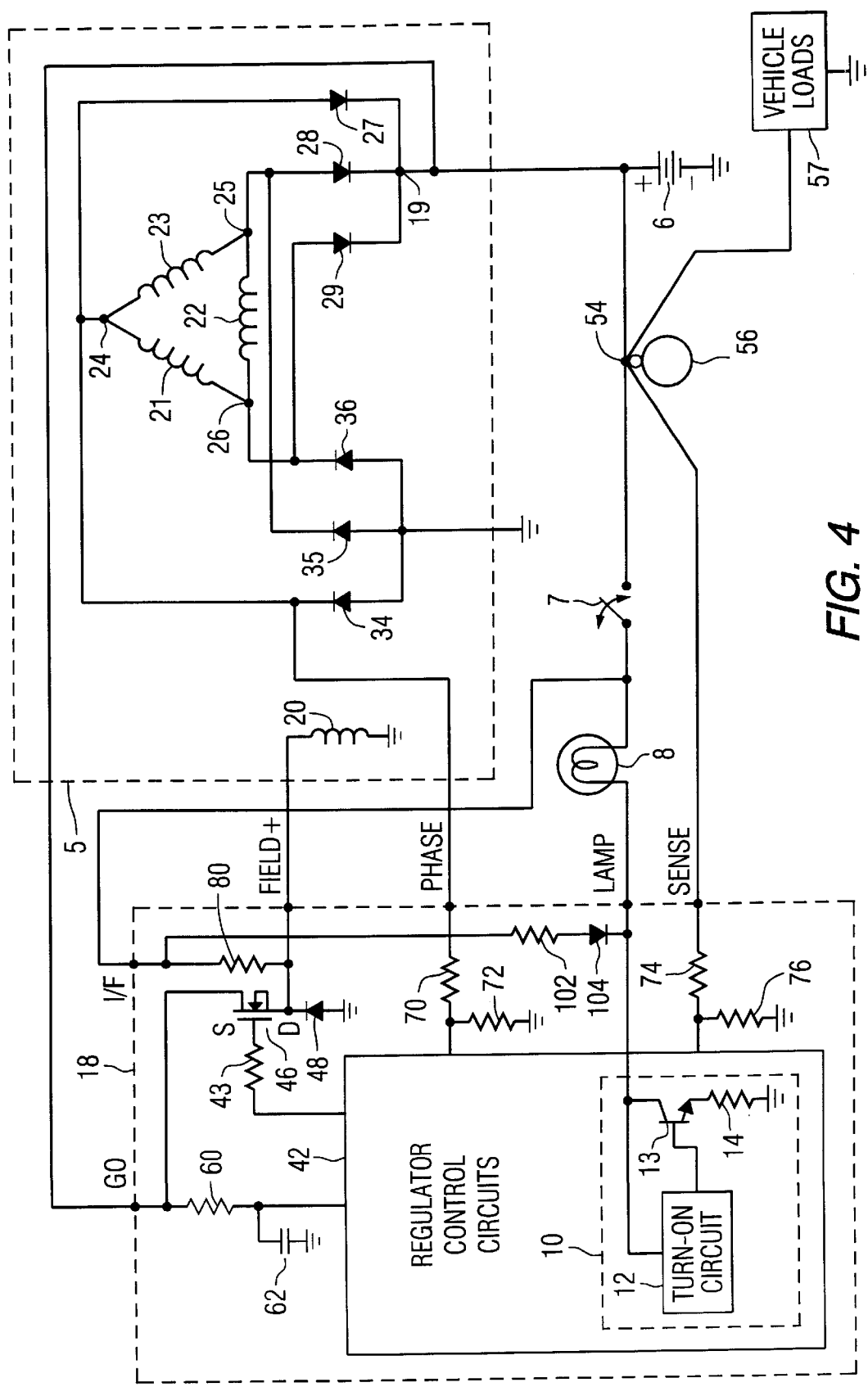

When installed in an automobile, the I/F terminal of the voltage regulator 18 can be connected to the automotive control system 80 (as shown in FIG. 3) or to the switch side of the lamp 8 (as shown in FIG. 4). Thus, the present invention provides for the supply of a single regulator model for both automotive installations.

In the FIG. 3 installation, when the alternator 5 is operating properly, the lamp terminal is driven high by the lamp driver 10, as discussed in conjunction with FIG. 1. The lamp 8 is not used in the FIG. 3 embodiment. This high voltage reverse biases the diode 104, effectively opening the circuit between the I/F terminal and the lamp terminal. As a result, the I/F terminal functions as a conventional F terminal, connected to the field+terminal by the resistor 80 and to the automotive control system 82, as discussed in conjunction with FIG. 2.

The voltage regulator 18 according to the teachings of the present invention can also be installed in a vehicle as shown in FIG. 4. In this installation the I/F terminal is connected between the switch 7 and the lamp 8, creating a bypass circuit around the lamp 8 when burned out (i.e., open circuited). Note that this bypass circuit serves the same function as the I terminal in FIG. 1. The voltage at the point between the switch 7 and the lamp 8 forward biases the diode 104 and turns the regulator 18 on when the lamp is open.

Thus, as can now be appreciated, the present invention (the voltage regulator 18) provides for supplying a single voltage regulator model that can provide the functions of two prior art voltage regulator models (voltage regulators 15 and 17). While the invention has been described with reference to a preferred embodiment, it will be understood by those skilled in the art that various changes may be made and equivalent elements may be substituted for elements thereof without departing from the scope of the invention.

The scope of the present invention further includes any combination of the elements from the various embodiments set forth herein. In addition, modifications may be made to adapt a particular situation to the teachings of the present invention without departing from the essential scope thereof. Therefore, it is intended that the invention not be limited to the particular embodiment disclosed as the best mode contemplated for carrying out this invention but that the invention will include all embodiments falling within the scope of the appended claims.

What is claimed is:

1. A voltage regulator for an automotive alternator battery charging system, said automotive alternator battery charging system further comprising a battery and an alternator coupled to the battery, and an operator-controlled switch connected between the battery and said voltage regulator for activating said voltage regulator upon closure of the operator-controlled switch, wherein the alternator is further drivingly coupled to a vehicle engine and provides a rectified output charging signal for charging the battery in accordance with an excitation signal provided by said voltage regulator to a field coil of the alternator, said voltage regulator comprising:

a first module responsive to the battery voltage for providing a sensed signal representative of the battery voltage;

a field terminal;

a second module for providing an excitation signal to the alternator field coil in response to said sensed signal, wherein said excitation signal is provided at said field terminal;

an input terminal;

an I/F terminal connected via a unidirectional switch to said input terminal and further connected to said field terminal; and wherein said I/F terminal provides a signal representative of the excitation signal when said unidirectional switch is open and provides a bypass circuit around said input terminal when said unidirectional switch is closed.

2. The voltage regulator of claim 1 wherein the unidirectional switch comprises a series connection of a diode and a resistor.

3. The voltage regulator of claim 1 wherein the I/F terminal is connected to the field terminal via a resistor.

4. The voltage regulator of claim 1 wherein the input terminal goes to a low voltage state when the alternator stops rotating.

5. The voltage regulator of claim 1 further comprising a turn-on circuit responsive to the rotation of the alternator, wherein said turn-on circuit provides a signal to the L terminal when there is no field excitation.

6. The voltage regulator of claim 5 wherein the turn-on circuit connects the input terminal to ground when there is no field excitation.

7. The voltage regulator of claim 5, wherein the turn-on circuit includes a controller responsive to the excitation signal for switching a transistor, wherein when said transistor is switched on, a circuit is completed to ground via the collector-emitter junction of said transistor, thereby placing the input terminal at ground potential.

* * * * *